United States Patent [19]

Hutson

[11] 4,300,303
[45] Nov. 17, 1981

[54] CANE FISHING POLE TIP

[76] Inventor: Duane Hutson, 1315 Country Club Prado, Coral Gables, Fla. 33134

[21] Appl. No.: 172,123

[22] Filed: Jul. 25, 1980

[51] Int. Cl.³ .............................................. A01K 87/00
[52] U.S. Cl. ......................................... 43/24; 43/43.1
[58] Field of Search ...................... 43/24, 43.1, 43.14; 24/115 R

[56] References Cited

U.S. PATENT DOCUMENTS

| 58,833 | 10/1866 | Isaacs | 43/24 |
| 796,342 | 8/1905 | Miller et al. | 43/24 |
| 1,010,301 | 11/1911 | Neats | 59/93 |
| 2,735,208 | 2/1956 | Barletti | 43/24 |
| 2,996,825 | 8/1961 | Tjernlund | 43/24 |

Primary Examiner—Donald R. Schran
Attorney, Agent, or Firm—Robert J. Van Der Wall

[57] ABSTRACT

A fishing pole tip, including a main tubular shank portion for glued attachment to the tip end of a pole such as a cane pole, and a front end cap, having a diametrically disposed hole in its front wall, opening into an enlarged interiorly threaded chamber for threaded engagement onto an exteriorly threaded, longitudinally diametrically slotted front end nose portion of the main tip portion. The front end of the nose portion and the interior front end of the cap are complimentarily tapered in a manner whereby a fishing line, extending inwardly through the front end cap hole, through the nose slot and outwardly between a rear edge of the cap and a shoulder rearwardly of the nose portion, will be securely locked against longitudinal adjustment when the cap is tightened on the nose portion while permitting a length adjustment of the usable portion of the fishing line when the cap is loosened.

7 Claims, 4 Drawing Figures

CANE FISHING POLE TIP

BACKGROUND OF THE INVENTION

U.S. Pat. No. 58,833, to R. N. Isaacs illustrates a fishing rod tip which includes no line adjustment means. U.S. Pat. No. 2,996,825, to D. F. Tjernlund pertains to a fishing rod tip devoted to an anti-tangling means. U.S. Pat. No. 2,735,208, to J. E. Bartletti illustrates a rod tip to wipe an antifreeze solution on a fishing line and is related to icefishing.

U.S. Pat. Nos. 3,056,229, to V. B. Haney and 3,736,690, to Sigmund Witkowski pertain to fishing floats and bobbers and are not related to the inherent problems of providing a fishing rod tip to a type of the instant invention.

A variety of mechanical devices utilizing adjustment means to adjust the length of relatively heavy cables are disclosed in U.S. Pat. Nos. 969,195, to S. Rothstein; 1,010,301, to H. S. Neats; and 2,130,825, to M. D. Bergan. None of these devices are applicable to adjusting the length of a fishing line.

Cane pole fishing is conventionally accomplished by tying a fishing line to the end of the pole. Generally the line is tied a second time further down the pole to prevent loss of the line in the event the pole is bent in the process of catching a fish, and monofilament line, most often used for fishing, is difficult to securely tie to a cane pole.

The length of the line from the pole tip to the hook is often changed for different fishing conditions, such as the height above the water level at which the pole is held, as is often determined by the height of a boat deck or a bank bordering a body of water. This normally necessitates retying the line to the pole tip periodically, or starting with a new line each time.

SUMMARY OF THE INVENTION

With the foregoing in mind, one of the principal objects of the present invention is to provide a tip end device for attachment to the tip end of a cane pole which permits attachment of any type of fishing line, such as a monofilament line, thereto without the use of knots.

A further object of the invention is to provide a tip end device which employs a main tubular shank portion for attachment to the tip end of the pole and a cap for screwthreaded engagement on a front end portion of the shank portion in a manner so as to secure a line to the shank portion.

Yet another object of the invention is to provide a passageway through the cap and a front nose portion of the shank which permits a sliding movement of the fishing line therethrough to adjust the length of the line from the pole tip to a hook, when the cap is in a loosened condition on the shank portion, and locks or secures the line at a predetermined set length when the cap is tightened.

Other objects and advantages will become apparent upon reading the following descriptions of the invention and upon reference to the drawings.

In accordance with the invention, there is provided a fishing pole tip, including a main tubular shank portion for glued attachment to the tip end of a pole such as a cane pole, and a front end cap, having a diametrically disposed hole in its front wall, opening into an enlarged interiorly threaded chamber for threaded engagement onto an exteriorly threaded, longitudinally diametrically slotted front end nose portion of the main tip portion. The front end of the nose portion and the interior front end of the cap are complimentarily tapered in a manner whereby a fishing line, extending inwardly through the front end cap hole, through the nose slot and through a slot in a shoulder rearwardly of the nose portion, will be securely locked against longitudinal adjustment when the cap is tightened on the nose portion while permitting a length adjustment of the usable portion of the fishing line when the cap is loosened.

The invention will be better understood after reading the following detailed description of the embodiments thereof with reference to the appended drawings, in which:

DETAILED DESCRIPTION

Figure 1:
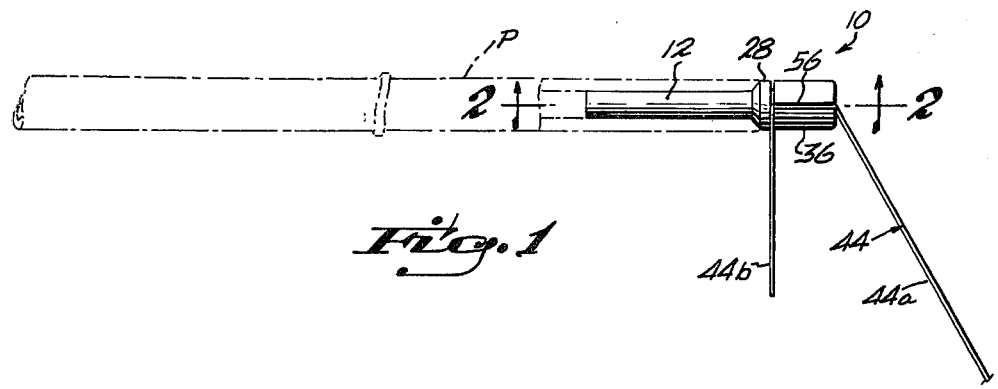
FIG. 1 is a side elevational view of the fishing pole tip, attached to the tip end of a cane pole, illustrated in phantom.

With reference to the drawings, and particularly to FIG. 1, the fishing pole tip, designated generally at 10, is illustrated in a fixed relation to the tip end of a cane pole P, illustrated in phantom. A shank portion of the tip 10 includes a main tubular length 12, which is secured as by a suitable adhesive within the tip end portion of the natural hole in a cane pole. The tubular length 12 may be formed of a suitable diameter, whereby the cavity 14 therein may receive a tip end of a solid type of fishing pole.

Figure 3:
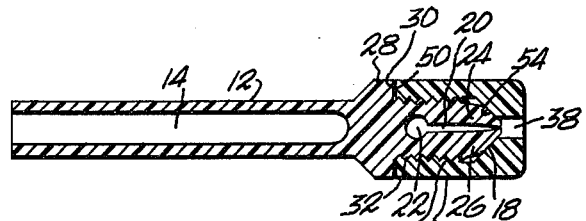
FIG. 3 is a longitudinal cross-section taken along line 3—3 of FIG. 2.
Figure 4:
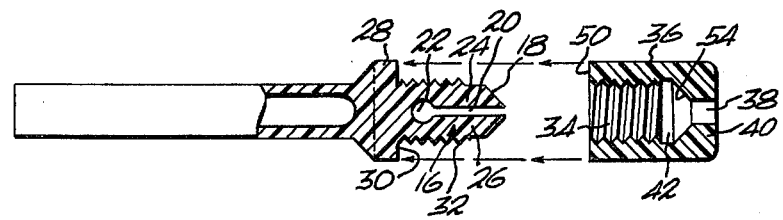
FIG. 4 is an exploded view of FIG. 3.

Formed integrally with the tubular length 12 is a front end nose, designated generally at 16. As best illustrated in FIGS. 3 and 4, the nose 16 is conically tapered at 18 at its forward end and is diametrically slotted at 20 to a cross bore 22 to define a pair of jaws 24, 26, for a purpose to be hereinafter described. An enlarged annular flange 28 is formed between nose 16 and tubular length 12 and defines a forward shoulder 30.

Rearwardly of the conical tapered tip end 18, the nose 16 is exteriorly screwthreaded at 32 for threaded reception in interior threads 34 of a cap 36. A reduced diameter hold 38 is diametrically formed through a front cap wall 40 to open into the cap chamber 42, including threads 34. A passageway is therefore defined for the fishing line 44, FIG. 1, as defined by the arrows 46 in FIG. 2. The passageway extends through hold 38, slot 20, across bore 22, a slot portion 48, rearwardly of bore 22, and between shoulder 30 and a rear annular face 50 of cap 36.

Figure 2:
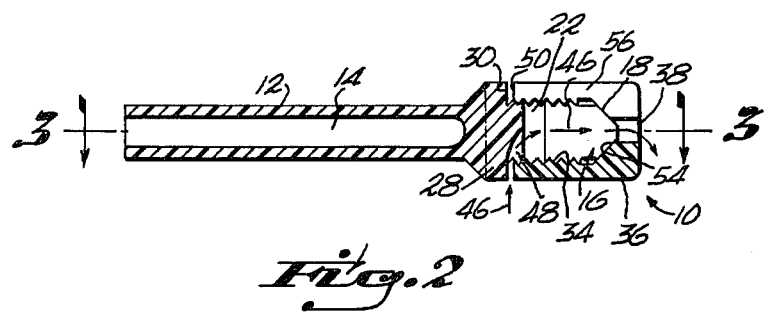
FIG. 2 is a longitudinal cross-section taken along line 2—2 of FIG. 1.

Therefore, in use, the line portion 44a, FIG. 1, extending to a hook (not shown) may be lengthened by pulling on portion 44a with the cap 36 somewhat loose as in FIG. 2, or it may be shortened by pulling on portion 44b. When the line is set to a desired length, the cap 36 is tightened to secure the line between the clamped jaws 24, 26 as in FIG. 3 and between the shoulder 30 and the annular cap face 50. It is to be noted that the inner front wall includes complimentary female tapered surfaces, as at 54, relative to the jaw taper 18 to effect the clamping action of jaws 24, 26. Cap 36 may be longitudinally slotted as at 56 to permit a degree of flexure thereof.

In practice, the line 44 is inserted through cap hole 38 and through the balance of passageway 46 prior to screwthreading the cap 36 onto the nose portion 16. The line is then adjusted to a desired length and the cap 36 is then tightened on the nose to effect the locking of line 44 in a fixes position. As above described, the line 44 may, at any time, be readjusted to any desired length by simply loosening the cap 36. The fishing pole tip is preferably formed of a suitable plastic material to obviate damage to the fishing line.

Having described the presently preferred embodiment of the invention, it should be understood that various changes in construction and arrangement will be apparent to those skilled in the art and are fully contemplated herein without departing from the true spirit of the invention. Accordingly, there is covered all alternatives, modifications and equivalents as may be included within the spirit and scope of the invention as defined by the appended claims.

I claim:

1. A fishing pole tip for attachment to a tip end of a pole such as a cane fishing pole, comprising:
   a main shank portion, including a main tubular length for fixed engagement to the pole and a forward end portion;
   a cap removably attached onto said forward end portion and including a through hole in a front wall thereof;
   a passageway extending through said forward end portion in alignment with said through hole in a manner whereby a fishing line may be extended through said hole and passageway with respective portions thereof extending outwardly through said front wall hole and rearwardly outwardly of a rear end of said cap;
   means to permit the fishing line to be freely slid forwardly or rearwardly through said hole and passageway with said cap loosely attached on said forward end portion and to lock the fishing line against sliding movement when said cap is tightened on said forward end.

2. The fishing pole tip as defined in claim 1, wherein said passageway comprises a longitudinally extending diametric slot, dividing said forward end portion into a pair of side-by-side jaws, comprising a first of said means to lock.

3. The fishing pole tip as defined in claim 2, wherein said means to permit and lock comprises a conically tapered tip end of said forward end portion and a complimentary female taper within said cap which coact to clamp said jaws tightly against the line in said cap tightened condition, and to release the line in said cap loosened condition.

4. The fishing pole tip as defined in claim 3, including a diametrically enlarged shoulder portion connecting between said main tubular length and forward end portion.

5. The fishing pole tip as defined in claim 4, wherein said cap rear end includes an annular face which cooperates with said enlarged shoulder portion to comprise a second of said means to lock when said cap is in said tightened condition.

6. The fishing pole tip as defined in claim 2, including a diametric through bore intersecting an inner end of said slot.

7. The fishing pole tip as defined in claim 1, including a longitudinally extending slot, through a side wall of said cap, intersecting said through hole.

* * * * *